Patented Nov. 13, 1928.

1,691,067

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

PROCESS OF MAKING DIPOLYMER.

No Drawing.    Application filed July 20, 1926. Serial No. 123,816.

The object of my invention is to produce Dipolymer.

Dipolymer, as the term is herein employed, is a product, consisting of polymerized terpene hydrocarbons, which is obtained by polymerizing dipentene, turpentine, or pine oil. Although it is largely composed of the Dipolymer $(C_{10}H_{16})_2$, substantial proportions of higher polymers, $(C_{10}H_{16})_n$, are generally present. Dipentene, as the term is herein employed, refers to the cut of pine products boiling largely between 165 and 185° C., which is obtained in the steam distillation of pine wood. Pure dipentene boils at 174–6° C., but the term dipentene as herein used is intended to comprehend the crude product with the wider boiling range.

It is known to make Dipolymer, in the liquid phase, by treating turpentine or dipentene with sulfuric acid of various concentrations. I have discovered that it may be made, in the vapor phase, from dipentene, by a simple and economical new process.

Polymerization of dipentene in the vapor phase may be carried out, at temperatures ranging from 175–550° C., by passing the vapors of dipentene through a tube of iron or other suitable material at such a rate as will permit the vapors to remain in contact with a catalyst, filling or contained in the tube, long enough to cause a partial polymerization. For example, through an iron tube 28″ x 1″, heated to about 400° C., containing 8–10 mesh fuller's earth, is passed 200 cc. of dipentene at the rate of 50 cc. per hour. There were recovered 164 cc. of a product containing 62 cc. of Dipolymer. A portion of the unpolymerized oil was polymerized by repassing through the tube. The polymerization of the hydrocarbons of the dipentene to Dipolymer plus a proportion of the higher polymers involves the following reaction:

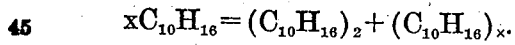
$xC_{10}H_{16} = (C_{10}H_{16})_2 + (C_{10}H_{16})_x.$

Fuller's earth is a highly efficient catalyst in the described vapor phase of polymerizing dipentene. Other clays, or silicious or argillaceous earths, such as filtrol; heated oxides, such as aluminum oxide, and heated chlorides, such as the chlorides of zinc, tin, aluminum and iron, as well as other polymerizing agents, may be substituted for fuller's earth, or mineral earth may be impregnated with an anhydrous metal chloride or oxide. While heat alone is capable of converting dipentene into Dipolymer, the use of a catalyst shortens the reaction period and permits operating at a lower temperature; and the conversion in vapor phase presents, in some material respects, distinct advantages.

The crude product which is obtained on polymerizing dipentene may be employed, in some instances, without refining; but it is usually preferable to distill off the lower boiling end, cutting around 250° C. By this procedure, the hydrocarbons and any unaltered dipentene are separated, leaving a residue consisting of crude Dipolymer.

A typical sample of crude Dipolymer has a specific gravity of 0.95, and the following boiling range: 5% over at 305° C., 20% at 326° C., 50% at 335° C., 70% at 342° C. and 90% at 375° C. If a cut is made when approximately 80% has distilled over, a product is obtained having a specific gravity of 0.94. A second cut may be made comprising approximately the 80–95% portion of the crude Dipolymer. This cut is exceedingly viscous and resembles a soft rosin. The residue is hard and brittle and has the appearance of a dark colored rosin. For some applications of the Dipolymer it may be desirable to separate it into cuts as outlined above.

The polymerization of dipentene to Dipolymer by means of metallic chlorides presents certain peculiar advantages and forms the subject-matter of a separate application.

Having now fully described my invention, what I claim and desire to protect by Letters Patent is:

1. The process of preparing Dipolymer from dipentene which comprises vaporizing dipentene and passing the vapors in intimate contact with a catalyst for such length of time and at such temperature as will effect the polymerization of a substantial part of the dipentene vapors.

2. The process of preparing Dipolymer from dipentene which comprises vaporizing dipentene and passing the vapors through a permeable catalyst for such length of time and at such temperature as will effect the polymerization of a substantial part of the pine oil vapors.

3. The process of preparing Dipolymer from dipentene which comprises passing the vapors of dipentene, while at a temperature above 175° C. and below 550° C., in intimate contact with a catalyst for such length of time as will effect the polymerization of a substantial part of the dipentene vapors.

4. The process of preparing Dipolymer from dipentene which comprises passing the vapors of dipentene, while at a temperature above 175° C. and below 550° C., in intimate contact with a catalyst for such length of time as will effect the polymerization of a substantial part of the dipentene vapors, condensing the product, and reheating to a temperature required to vaporize the lower boiling fractions of the same, leaving a residue which comprises principally Dipolymer.

5. The process of preparing Dipolymer from dipentene which comprises passing the vapors of dipentene, while at a temperature above 175° C. and below 550° C., in intimate contact with a catalyst for such length of time as will effect the polymerization of a substantial part of the dipentene vapors, condensing the product, and fractionally distilling the same at temperatures adapted to yield products having specific gravities progressively lower than .96.

6. The process of preparing Dipolymer from dipentene which comprises vaporizing dipentene and passing the vapors in intimate contact with fuller's earth for such length of time and at such temperature as will effect the polymerization of a substantial part of the dipentene vapors.

7. The process of preparing Dipolymer from dipentene which comprises passing the vapors of dipentene, while at a temperature of about 400° C. in intimate contact with a catalyst for such length of time as will effect the polymerization of a substantial part of the dipentene vapors.

In testimony of which invention, I have hereunto set my hand, at Philadelphia, Pennsylvania, on this 2nd day of July, 1926.

IRVIN W. HUMPHREY